United States Patent
Ueda (10) Patent No.: US 8,240,447 B2
(45) Date of Patent: Aug. 14, 2012

(54) DRIVE FORCE TRANSMISSION APPARATUS

(75) Inventor: Motohiko Ueda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 523 days.

(21) Appl. No.: 12/458,480

(22) Filed: Jul. 14, 2009

(65) Prior Publication Data

US 2010/0018827 A1 Jan. 28, 2010

(30) Foreign Application Priority Data

Jul. 24, 2008 (JP) ................................. 2008-191048

(51) Int. Cl.
*F16D 27/01* (2006.01)

(52) U.S. Cl. .................... 192/84.3; 192/84.6; 192/85.48; 192/101

(58) Field of Classification Search ................. 192/84.3, 192/84.31

See application file for complete search history.

(56) References Cited

U.S. PATENT DOCUMENTS

| | | | | | |
|---|---|---|---|---|---|
| 2,209,558 | A | * | 7/1940 | Bing et al. | 335/306 |
| 2,243,616 | A | * | 5/1941 | Bing et al. | 335/306 |
| 2,962,143 | A | * | 11/1960 | Heinemann | 192/84.3 |
| 3,240,304 | A | * | 3/1966 | Wickersham | 192/84.3 |
| 4,482,034 | A | * | 11/1984 | Baermann | 335/306 |
| 6,864,773 | B2 | * | 3/2005 | Perrin | 335/306 |
| 2007/0246322 | A1 | * | 10/2007 | Schachtl et al. | 192/84.31 |
| 2007/0251796 | A1 | * | 11/2007 | Moshenrose et al. | 192/84.3 |

FOREIGN PATENT DOCUMENTS

| | | | |
|---|---|---|---|
| EP | 0 084 140 | A1 * | 7/1983 |
| JP | 61-206827 | A | 9/1986 |
| JP | H03-96723 | A | 4/1991 |
| JP | H03-112136 | U | 11/1991 |
| JP | 2003-118597 | A | 4/2003 |

OTHER PUBLICATIONS

Office Action dated Feb. 23, 2011 issued in the corresponding Chinese Patent Application No. 200910164620.8 (English translation enclosed).

Notice of Reasons for Refusal mailed on May 11, 2010 issued from the Japanese Patent Office in the corresponding Japanese patent application No. 2008-191048 (and English translation).

* cited by examiner

*Primary Examiner* — Rodney Bonck (74) *Attorney, Agent, or Firm* — Posz Law Group, PLC

(57) ABSTRACT

An armature is magnetically attracted to and is coupled with a rotor against an urging force of a resilient member by a magnetic attractive force of the rotor when a permanent magnet is placed into a first position. When the armature is coupled with the rotor, a rotational drive force of an internal combustion engine transmitted to the rotor is transmitted to a refrigerant compressor connected to the armature to rotate the refrigerant compressor. The armature is urged away from and is decoupled from the rotor by the urging force of the resilient member when the permanent magnet is placed into a second position.

20 Claims, 9 Drawing Sheets

FIG. 1

FIRST END SIDE ⟷ SECOND END SIDE
AXIAL DIRECTION

DRIVE FORCE TRANSMISSION APPARATUS

CROSS REFERENCE TO RELATED APPLICATION

This application is based on and incorporates herein by reference Japanese Patent Application No. 2008-191048 filed on Jul. 24, 2008.

BACKGROUND OF THE INVENTION

1. Field of the Invention

The present invention relates to a drive force transmission apparatus.

2. Description of Related Art

Figure 9:
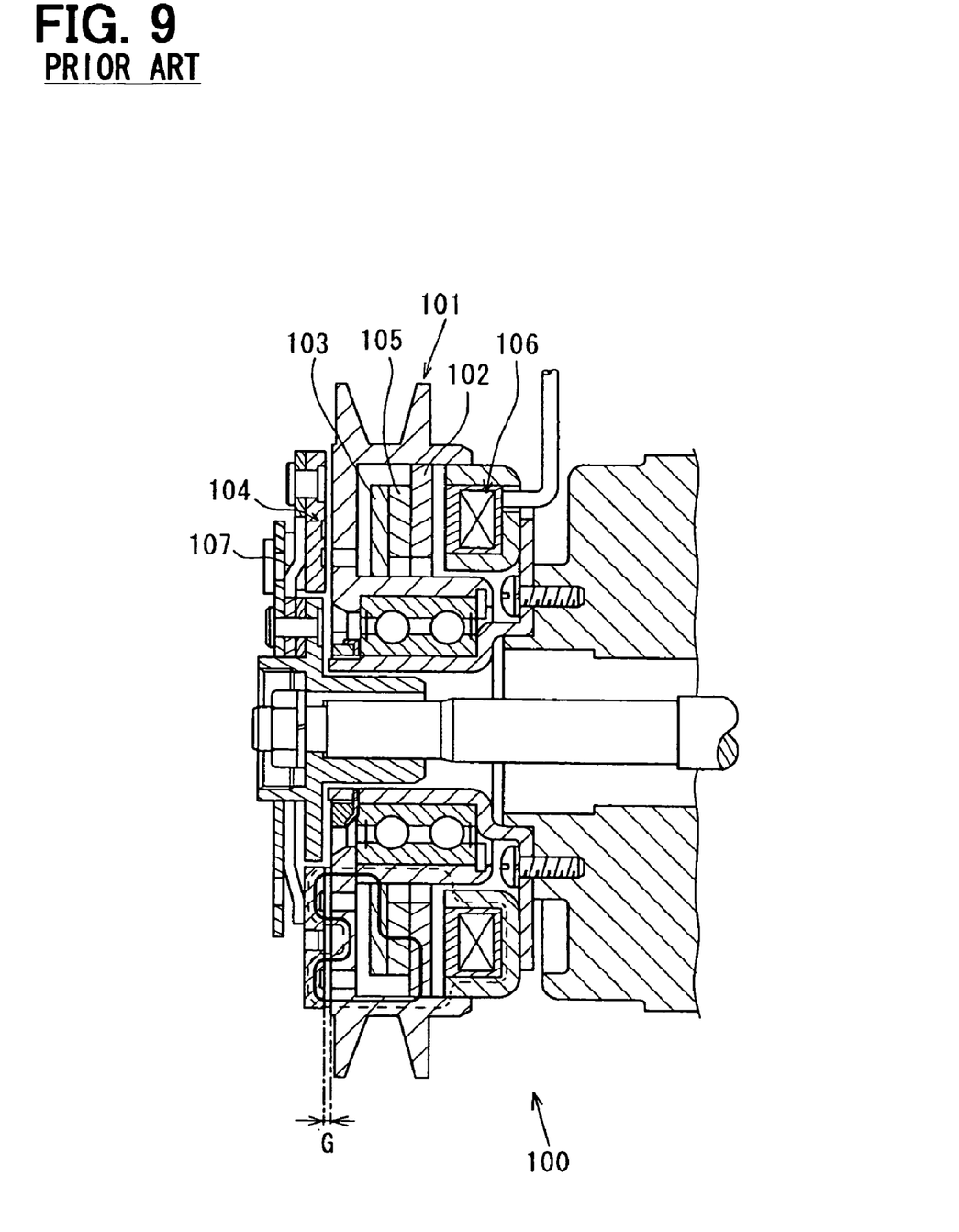
FIG. 9 is a schematic diagram showing a structure of a prior art drive force transmission apparatus.

With reference to FIG. 9, a prior art drive force transmission apparatus 100 includes an annular permanent magnet 105 and an electromagnetic coil 106 (see, for example, Japanese Unexamined Patent Publication No. S61-206827A, which was also published as Japanese Examined Patent Publication No. H02-2007B). In this drive force transmission apparatus 100, the annular permanent magnet 105 is clamped between a magnetic plate 102 and a magnetic plate 103, which are held by a rotor 101. The annular permanent magnet 105 generates a magnetic flux (indicated with a solid line in FIG. 9), which flows through an armature 104 and the rotor 101. The electromagnetic coil 106 generates a magnetic flux (indicated with a dotted line in FIG. 9) in a forward direction, which is the same as the direction of the flow of the magnetic flux (indicated with the solid line in FIG. 9) generated by the permanent magnet 105, or in an opposite direction, which is opposite from the direction of the flow of the magnetic flux (indicated with the solid line in FIG. 9) generated by the permanent magnet 105.

The drive force transmission apparatus 100, which uses the permanent magnet 105, normally does not require the electric power except the time of shifting between the clutch on-state (clutched state, i.e., coupled state) and the clutch off-state (declutched state, i.e., decoupled state).

That is, in the drive force transmission apparatus 100, when the electromagnetic coil 106 is energized to generate the magnetic flux in the forward direction, which is the same as the direction of the flow of the magnetic flux generated by the permanent magnet 105, the armature 104, which is spaced from the rotor 101 by a predetermined gap G having a predetermined size, is attracted to the rotor 101 against an urging force of a leaf spring 107. Therefore, the rotor 101 and the armature 104 are coupled with each other (in the clutch on-state). Thereafter, even when the energization of the electromagnetic coil 106 is stopped, the coupling between the rotor 101 and the armature 104 is maintained to maintain the clutch on-state due to the magnetic flux of the permanent magnet 105.

Furthermore, when the electromagnetic coil 106 is energized such that the magnetic flux generated from the electromagnetic coil 106 flows in the opposite direction, which is opposite from the direction of the flow of the magnetic flux generated by the permanent magnet 105, the magnetic flux of the permanent magnet 105 is reduced. Thereby, the armature 104 is displaced away from the rotor 101 by the urging force of the leaf spring 107, and thereby the gap G is formed once again between the armature 104 and the rotor 101 (the clutch off-state). Thereafter, even when the energization of the electromagnetic coil 106 is stopped, the armature 104 is not attracted to the rotor 101 by the magnetic flux of the permanent magnet 105 alone due to the presence of the gap G, and thereby the clutch off-state is maintained.

In some cases, a vibration or an external force may be applied to the drive force transmission apparatus 100, so that the predetermined size of the gap G may not be maintained and may be reduced.

In such a case, in the prior art drive force transmission apparatus 100, even in the state where the energization of the electromagnetic coil 106 is turned off, the magnetic flux, which is formed by the permanent magnet 105, flows like in the case where the clutch on-state is maintained. Therefore, when the size of the gap G is reduced from the predetermined size due to, for example, the vibration, the armature 104 may possibly be attracted to the rotor 101 by the amount of magnetic flux generated from the permanent magnet 105 alone. That is, in the clutch off-state where the energization of the electromagnetic coil 106 is turned off, the unintentional erroneous operational movement causing shifting from the clutch off-state to the clutch on-state may possibly occur.

SUMMARY OF THE INVENTION

The present invention addresses the above disadvantages. Thus, it is an objective of the present invention to limit occurrence of an erroneous operational movement in a drive force transmission apparatus, which uses a permanent magnet.

According to the present invention, there is provided a drive force transmission apparatus, which includes a permanent magnet, a magnet position changing means, a rotor, an armature and a resilient member. The permanent magnet is displaceable between a first position and a second position. The magnet position changing means is for displacing the permanent magnet between the first position and the second position. The rotor is rotated upon receiving a rotational drive force from an external drive power source. The rotor exerts a first magnetic attractive force in cooperation with the permanent magnet upon placing of the permanent magnet into the first position. The rotor exerts no magnetic attractive force or a second magnetic attractive force, which is smaller than the first magnetic attractive force, in cooperation with the permanent magnet upon placing of the permanent magnet into the second position. The armature is connected to an external driven-side apparatus and is coupleable with the rotor to transmit the rotational drive force from the rotor to the external driven-side apparatus. The armature is spaced from the rotor by a predetermined gap in an uncoupled state of the armature, in which the armature is uncoupled from the rotor. The resilient member holds the armature such that the predetermined gap is maintained between the rotor and the armature in the uncoupled state of the armature. The armature is magnetically attracted to and is coupled with the rotor against an urging force of the resilient member by the first magnetic attractive force of the rotor when the permanent magnet is placed into the first position. The armature is urged away from and is decoupled from the rotor by the urging force of the resilient member when the permanent magnet is placed into the second position.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A drive force transmission apparatus 1 according to a first embodiment of the present invention will be described with reference to FIGS. 1 to 6B.

Figure 1:
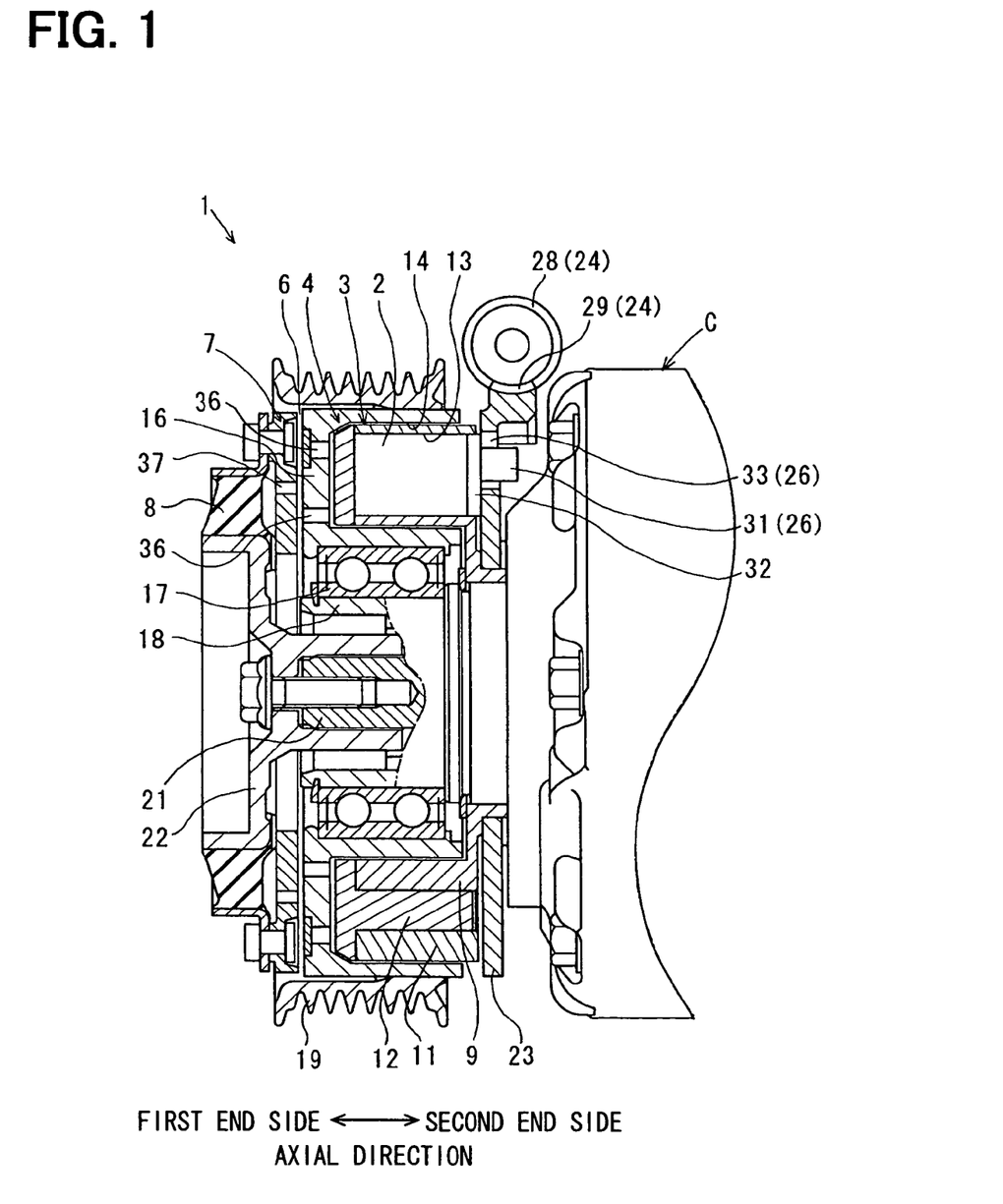
FIG. 1 is a schematic cross-sectional view of a drive force transmission apparatus according to a first embodiment of the present invention.

The drive force transmission apparatus 1 is installed to, for example, a refrigerant compressor C (a driven-side apparatus, i.e., a follower apparatus) of a vehicle air conditioning system to enable and disable transmission of a rotational drive force of an undepicted internal combustion engine (a drive power source) to the refrigerant compressor C. In FIG. 1, the left side corresponds to the first end side of the drive force transmission apparatus 1, and the right side corresponds to the second end side of the drive force transmission apparatus 1.

Figure 2:
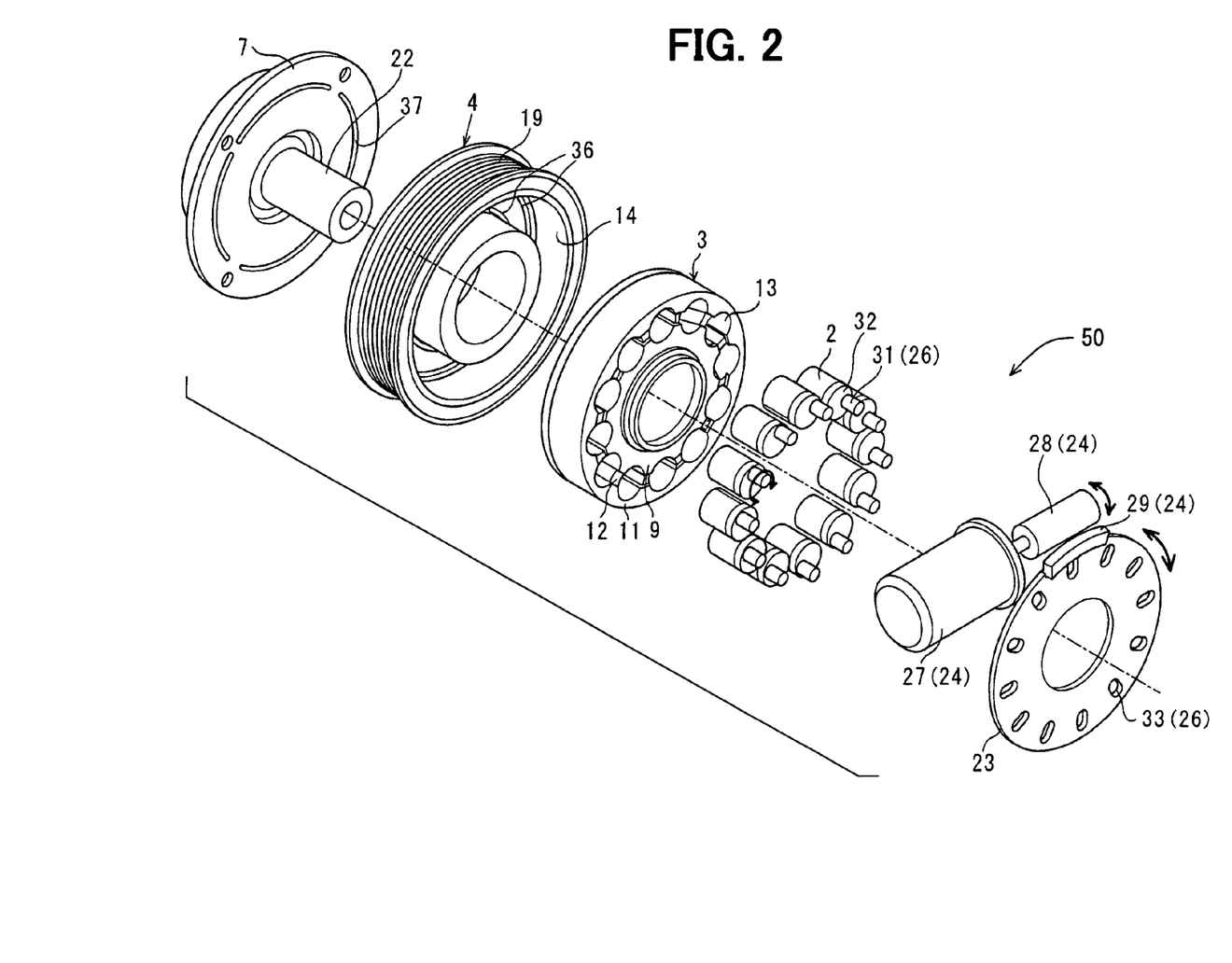
FIG. 2 is an exploded schematic view showing a structure of the drive force transmission apparatus according to the first embodiment.

The drive force transmission apparatus 1 includes a plurality of permanent magnets 2, a stator 3, a rotor 4, an armature 7 and a resilient member 8. The permanent magnets 2 are received in the stator 3. The rotor 4 is rotated by the rotational drive force transmitted from the engine. The armature 7 is made of a magnetic material (e.g., iron) and is connected to the refrigerant compressor C to drive the same. Furthermore, the armature 7 is axially opposed to the rotor 4 such that the armature 7 is axially spaced from the rotor 4 by a predetermined gap 6 in a decoupled state, in which the armature 7 is decoupled from the rotor 4. The resilient member 8 holds the armature 7 such that the gap 6 is formed and is maintained between the rotor 4 and the armature 7 in the decoupled state.

The stator 3 is configured into a generally cylindrical body and includes an annular inner stator portion 9, an annular outer stator portion 11 and an annular middle stator portion 12. The inner stator portion 9 forms a radially inner portion of the stator 3. The outer stator portion 11 forms a radially outer portion of the stator 3. The middle stator portion 12 is radially placed between the inner stator portion 9 and the outer stator portion 11. The inner stator portion 9, the outer stator portion 11 and the middle stator portion 12 are integrally fixed and are placed in the interior of the rotor 4.

The middle stator portion 12 is made of a non-magnetic material (e.g., aluminum, copper, resin) and is configured into a generally cylindrical (annular) body having a T-shaped cross section. The inner stator portion 9 and the outer stator portion 11 are made of a magnetic material (e.g., iron) and are respectively configured into a generally cylindrical (annular) body. The inner stator portion 9 is fixed to a radially inner part of the middle stator portion 12, and the outer stator portion 11 is fixed to a radially outer part of the middle stator portion 12.

The stator 3 has a plurality (twelve in this embodiment) of generally cylindrical receiving holes 13, which are arranged one after another at generally equal intervals along an imaginary circle that is coaxial with the central axis of the stator 3. The generally cylindrical permanent magnets 2 are received in the receiving holes 13, respectively. Here, a radially outer end of each receiving hole 13 is located in the outer stator portion 11. A radially inner end of the receiving hole 13 is located in the inner stator portion 9. A radially middle part of the receiving hole 13, which is placed radially between the radially outer end and the radially inner end of the receiving hole 13, is located in the middle stator portion 12.

Each permanent magnet 2 is radially magnetized such that one radial half of the permanent magnet 2 is magnetized into the N-pole, and the other radial half of the permanent magnet 2 is magnetized into the S-pole. Furthermore, each permanent magnet 2 is received in the corresponding receiving hole 13 and is rotatable about a rotational axis of the permanent magnet 2.

The rotor 4 is made of a magnetic material (e.g., iron or low-carbon steel). The rotor 4 has an annular groove 14, so that the rotor 4 has a generally U-shaped cross section. Furthermore, the stator 3 is received in the annular groove 14 of the rotor 4 such that a bottom wall 16 of the annular groove 14 covers one axial end of the stator 3. A minute gap is formed between the inner peripheral surface of the stator 3 and a corresponding opposed surface the annular groove 14, and also a minute gap is formed between the outer peripheral surface of the stator 3 and a corresponding opposed surface of the annular groove 14.

Furthermore, the rotor 4 is rotatably supported by the housing 18 of the refrigerant compressor C through a ball bearing 17, which is installed to the inner peripheral side of the rotor 4. A pulley 19 is provided along an outer peripheral part of the rotor 4. The rotational drive force of the engine is transmitted to the rotor 4 through a belt (not shown), which is placed around the pulley 19.

The armature 7 is configured into a generally annular body and is axially opposed to the rotor 4 such that the gap 6 is formed between the armature 7 and the rotor 4 in the uncoupled state. A hub 22 is connected to the armature 7 through the resilient member 8, and this hub 22 is, in turn, connected to the shaft 21 of the refrigerant compressor C. The resilient member 8 urges the armature 7 in a direction opposite from the rotor 4 in such a manner that the gap 6 is formed between the armature 7 and the rotor 4. In the present embodiment, the resilient member 8 is made of rubber, which is provided between the hub 22 and the armature 7. Alternatively, the resilient member 8 may be made from a leaf spring, a coil spring or the like.

The drive force transmission apparatus 1 further includes a magnet position changing arrangement or mechanism (a magnet position changing means) 50 for changing the position of each permanent magnet 2, i.e., for displacing the permanent magnet 2 between a first position and a second position (described in detail later).

Now, the structure of the magnet position changing arrangement 50 will be described.

In the present embodiment, the magnet position changing arrangement 50 rotates each permanent magnet 2 about the rotational axis thereof to change the rotational position of the permanent magnet 2. The magnet position changing arrangement 50 includes a rotatable member 23, a rotating device (serving as a rotating means) 24 and a link mechanism 26. The rotatable member 23 is rotatable about the axis of the stator 3. The rotating device 24 rotates the rotatable member 23. The link mechanism 26 rotates the permanent magnet 2 synchronously with the rotation of the rotatable member 23.

The rotatable member 23 is configured into a rotatable circular disc body, which is rotatable about the axis of the stator 3. The rotatable member 23 is placed between the stator 3 and the housing 18 in such a manner that the rotatable member 23 is axially opposed to the stator 3 and the permanent magnets 2.

Figure 3:
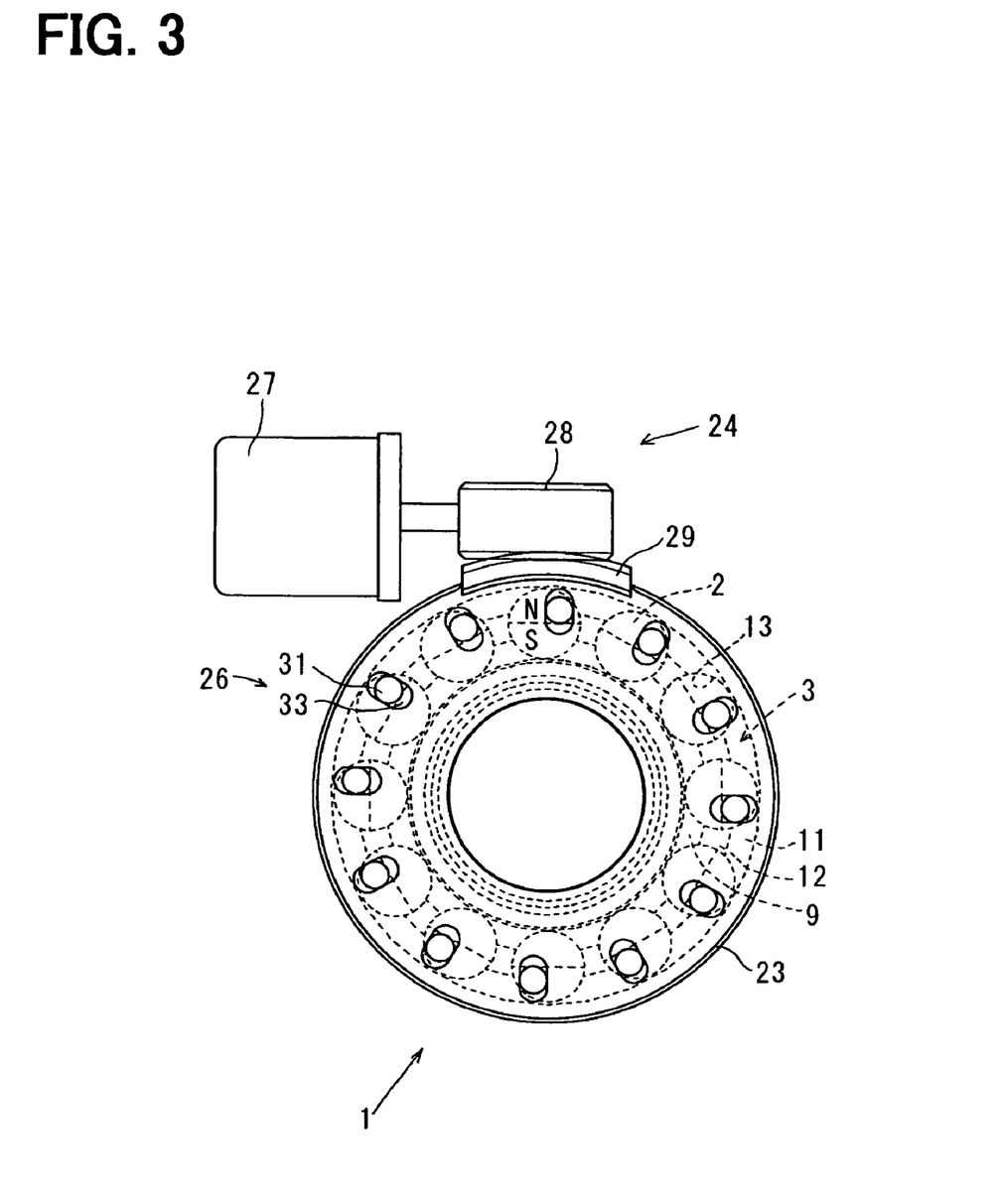
FIG. 3 is an axial view taken in an axial direction of a rotatable member of the drive force transmission apparatus, showing the drive force transmission apparatus held in a clutch on-state according to the first embodiment.

The rotating device 24 has a worm gear that includes a worm 28, which is rotated by an electric motor 27, and a worm wheel 29, which is provided to the outer peripheral part of the rotatable member 23.

That is, the worm wheel 29 is provided to a section of the outer peripheral part of the rotatable member 23, and the worm 28 is meshes with the worm wheel 29. When the worm 28 is rotated by the motor 27, the worm wheel 29, which is meshed with the worm 28, is rotated about the axis of the stator 3 to rotate the rotatable member 23 about the axis of the stator 3. The worm wheel 29 may be provided along the entire outer peripheral part of the rotatable member 23 (extending along the entire outer peripheral edge of the rotatable member 23).

The link mechanism 26 includes pins 31, which are respectively provided to the permanent magnets 2, and elongated holes (oblong holes) 33, which are provided to the rotatable member 23. Each pin 31 is provided to the corresponding permanent magnet 2 at a location, which is eccentric to the rotational axis of the permanent magnet 2. Furthermore, each pin 31 is received through the corresponding elongated hole 33 of the rotatable member 23. With this construction, the link mechanism 26 forms a crank mechanism between the rotatable member 23 and the permanent magnets 2.

More specifically, the pin 31 is formed integrally with a circular disc plate 32, which is fixed to the other axial end of the permanent magnet 2 that is opposed to the rotatable member 23, in such a manner that the pin 31 is eccentric to the rotational axis of the permanent magnet 2. The pin 31 and the plate 32 are made of a non-magnetic material, such as stainless steel.

Furthermore, the elongated holes 33 are formed in the rotatable member 23 to respectively correspond with the pins 31 in such a manner that the number (twelve in this embodiment) of the elongated holes 33 is equal to the number of the permanent magnets 2, and the pins 31 are received through the elongated holes 33, respectively.

Figure 4:
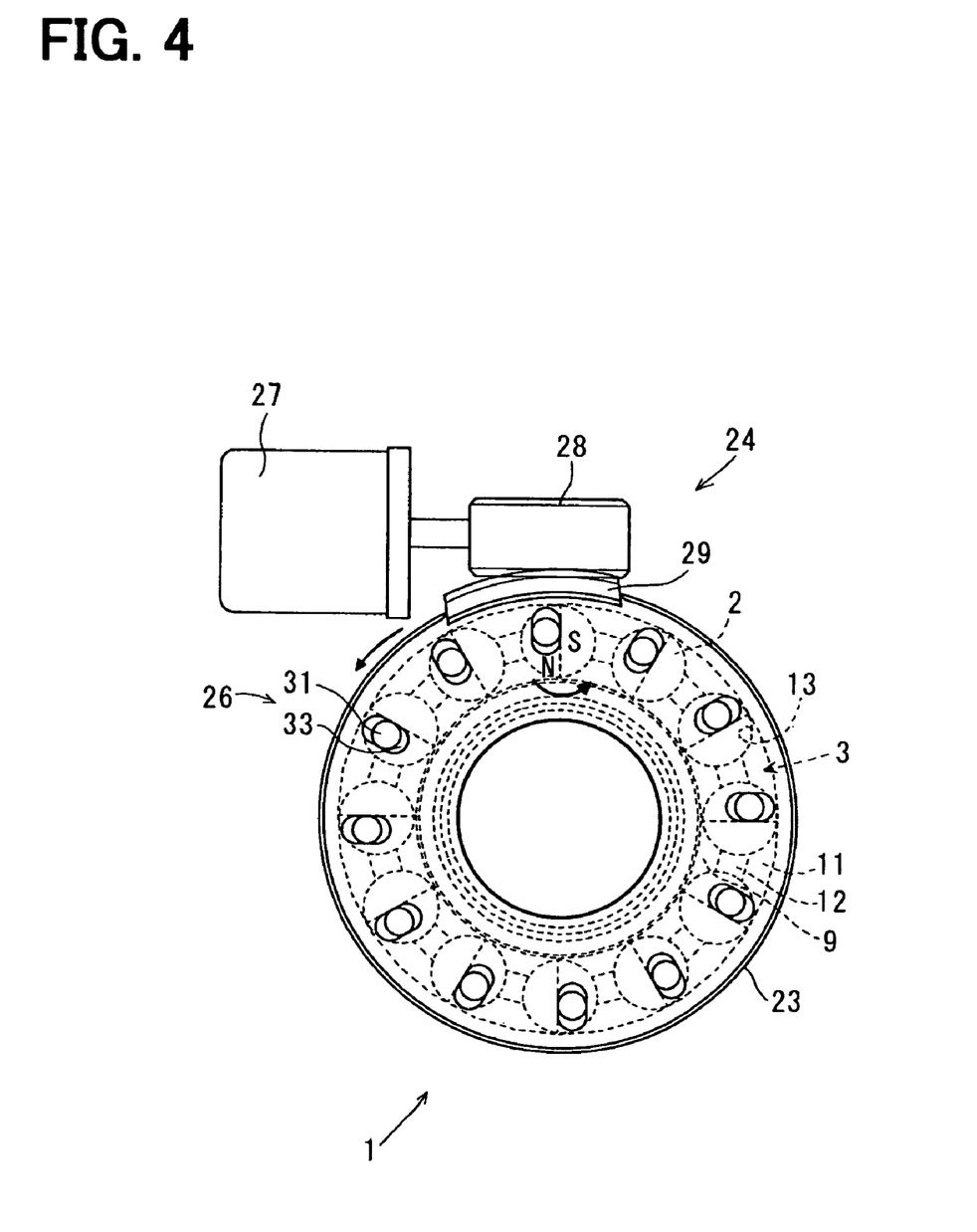
FIG. 4 is an axial view taken in the axial direction of the rotatable member of the drive force transmission apparatus, showing the drive force transmission apparatus held in a clutch off-state according to the first embodiment.

When the rotatable member 23 is rotated, the elongated holes 33 are moved, i.e., are rotated together with the rotatable member 23. At this time, the pin 31 of each permanent magnet 2 is moved along the elongated hole 33 to implement the crank action, so that the permanent magnet 2 is rotated within the corresponding receiving hole 13 of the stator 3.

The N-pole and the S-pole of the permanent magnet 2 are magnetized in a manner that implements a predetermined angular relationship of the N-pole and the S-pole relative to the pin 31. When the rotatable member 23 is rotated, the position of the permanent magnet 2 is shifted between the first position, at which a first magnetic circuit (described later) is formed, and the second position, at which a second magnetic circuit (described later) is formed.

Now, the operation of the drive force transmission apparatus 1 of the first embodiment will be described with reference to FIGS. 3 to 6B.

In the present embodiment, the rotational position of each permanent magnet 2 is changed between the first position and the second position to shift the circuit between the first magnetic circuit and the second magnetic circuit and thereby to enable and disable the transmission of the rotational drive force from the engine side to the refrigerant compressor C side. Here, in the first magnetic circuit, the magnetic flux flows through, i.e., is transmitted through the rotor 4 and the armature 7. In the second magnetic circuit, the magnetic flux, which is transmittable to the rotor 4 and the armature 7, is smaller, i.e., weaker than that of the first magnetic circuit.

First, the first and second positions of the permanent magnets 2 as well as the first and second magnetic circuits, which are formed at the first and second positions, respectively, of the permanent magnets 2, will be described.

Figure 5A:
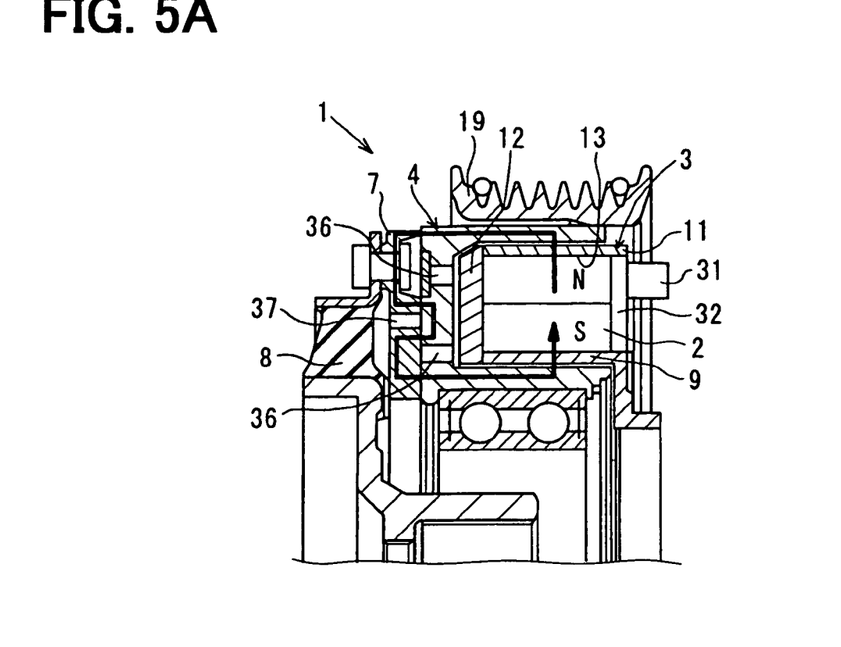
FIG. 5A is a partial longitudinal cross-sectional view of the drive force transmission apparatus held in the clutch on-state, showing one of permanent magnets and a first magnetic circuit according to the first embodiment.
Figure 5B:
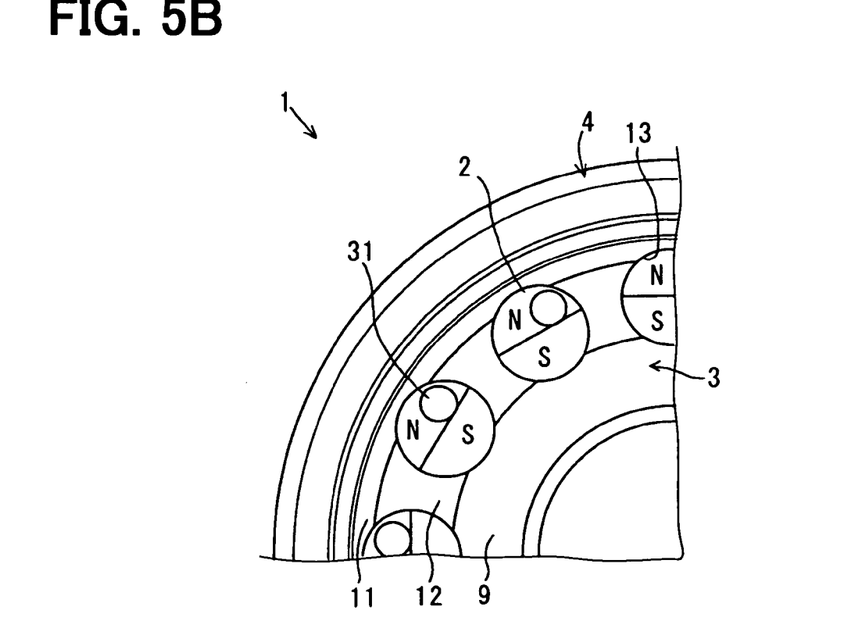
FIG. 5B is a partial axial view of the drive force transmission apparatus shown in FIG. 5A.

In the present embodiment, with reference to FIGS. 3, 5A and 5B, the first magnetic circuit is formed when each permanent magnet 2 is placed into the first position, at which a direction of magnetization of the permanent magnet 2 generally coincides with a radial direction of the stator 3, i.e., at which a boundary line between the S-pole and the N-pole of the permanent magnet 2 is tangential to an imaginary circle that is coaxial with the stator 3. In other words, the N-pole and the S-pole of the permanent magnet 2 are opposed to each other generally in a radial direction of the stator 3. In this position, one (e.g., S-pole) of the magnetic poles of each permanent magnet 2 contacts the inner stator portion 9, and the other one (e.g., N-pole) of the magnetic poles of the permanent magnet 2 contacts the outer stator portion 11. At this time, the rotor 4 exerts a substantial magnetic attractive force because of the magnetic flux, which is generated from the permanent magnets 2 and is transmitted to the rotor 4 through the stator 3, so that the armature 7 is magnetically attracted to and is coupled with the rotor 4 against the urging force of the resilient member 8.

In this state, the magnetic flux of the permanent magnet 2 bypasses the elongated arcuate hole 36 of the rotor 4 and the elongated arcuate hole 37 of the armature 7 and thereby flows mainly through the N-pole of the permanent magnet 2, the rotor 4, the armature 7, the rotor 4, the armature 7, the rotor 4 and the S-pole of the permanent magnet 2 in this order (see the arrow in FIG. 5A). Therefore, the large magnetic attractive force is created between the rotor 4 and the armature 7.

Figure 6A:
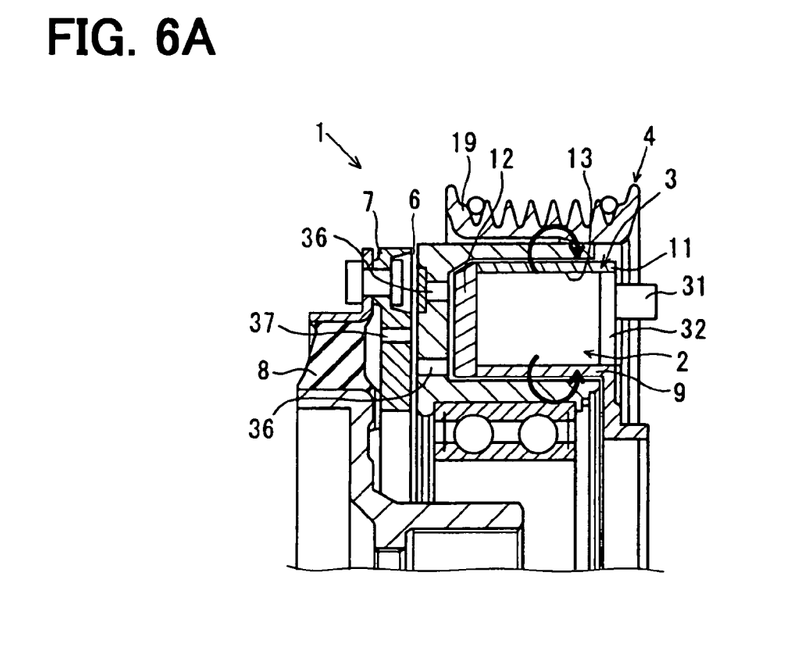
FIG. 6A is a partial longitudinal cross-sectional view of the drive force transmission apparatus held in the clutch off-state, showing the permanent magnet and a second magnetic circuit according to the first embodiment.
Figure 6B:
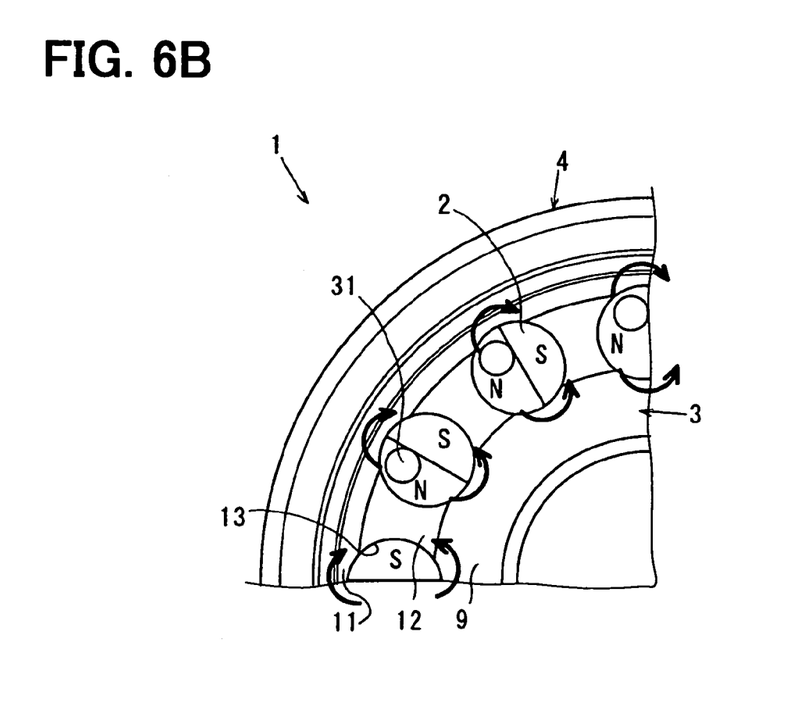
FIG. 6B is a partial axial view of the drive force transmission apparatus shown in FIG. 6A.

Furthermore, with reference to FIGS. 4, 6A and 6B, the second magnetic circuit is formed when each permanent magnet 2 is placed into the second position, at which the direction of magnetization of the permanent magnet 2 is tangential to the imaginary circle that is coaxial with the stator 3, i.e., at which the boundary line between the S-pole and the N-pole of the permanent magnet 2 generally coincides with the radial direction of the stator 3. In other words, the N-pole and the S-pole of the permanent magnet 2 are opposed to each other generally in the circumferential direction of the stator 3. In this state, each of the magnetic poles (N-pole and S-pole) of the permanent magnet 2 contacts both of the inner stator portion 9 and the outer stator portion 11.

In this state, the magnetic flux, which is created by the permanent magnet 2, mainly flows through the N-pole of the permanent magnet 2, the inner stator portion 9 and the S-pole of the permanent magnet 2 in this order and also flows through the N-pole of the permanent magnet 2, the outer stator portion 11 and the S-pole of the permanent magnet 2 in this order (see the arrows in FIGS. 6A and 6B). That is, the magnetic circuit is short-circuited by the inner stator portion 9 and the outer stator portion 11, so that the magnetic flux does not substantially flow through the rotor 4 and the armature 7. Thus, the rotor 4 exerts no magnetic attractive force or exerts a magnetic attractive force smaller, i.e., weaker than that of the first magnetic circuit. Thereby, the armature 7 is urged away and is decoupled from the rotor 4 by the urging force of the resilient member 8.

Here, even in the second position of the permanent magnet 2, the magnetic flux, which leaks from the permanent magnet 2, may possibly flow through the rotor 4 and the armature 7. However, the magnetic flux generated in such a case is weaker and is much smaller than the magnetic flux, which flows through the rotor 4 and the armature 7 in the first magnetic circuit. Therefore, the second magnetic circuit is not the circuit, which actively conducts the magnetic flux through the rotor 4 and the armature 7. Thus, the magnetic flux, which is formed in the second magnetic circuit and is transmitted through the rotor 4 and the armature 7, is smaller, i.e., weaker than the magnetic flux, which is formed in the first magnetic circuit.

Therefore, when each permanent magnet 2 is placed into the second position, at which the second magnetic circuit is formed, the magnetic flux, which flows through the rotor 4 and the armature 7, would be weak. Thus, even when the magnetic attractive force is generated between the rotor 4 and the armature 7, this magnetic attractive force is smaller than that of the first magnetic circuit and is smaller than the urging force of the resilient member 8.

Next, the position changing operation for changing the rotational positions of the permanent magnets 2 will be described.

The rotational positions of the permanent magnets 2 are changed by the magnet position changing arrangement 50. Specifically, when the worm 28 is rotated by the motor 27, the rotatable member 23, which has the worm wheel 29 that is meshed with the worm 28, is rotated about the axis of the stator 3. When the rotatable member 23 is rotated, the elongated holes 33, which are formed in the rotatable member 23, are moved, i.e., rotated together with the rotatable member 23, so that the inner peripheral edge of each elongated hole 33 urges the corresponding pin 31 to move the pin 31 along the elongated hole 33 to implement the crank action. Therefore, the permanent magnet 2 is rotated within the receiving hole 13 to change its position between the first position for forming the first magnetic circuit and the second position for forming the second magnetic circuit. Then, when the position of the permanent magnet 2 is changed to the corresponding one of the first position and the second position, the rotation of the motor 27 is stopped.

Finally, shifting between the clutch on-state (clutched state, i.e., coupled state) and the clutch off-state (declutched state, i.e., decoupled state), which are implemented by the positional changes of the permanent magnets 2, will be described.

First, the worm 28 is driven by the motor 27 to rotate the rotatable member 23 to place each permanent magnet 2 into the first position. Then, the armature 7 is attracted to the rotor 4 by the magnetic attractive force generated between the rotor 4 and the armature 7, so that the rotor 4 is coupled with the armature 7 to transmit the rotational drive force from the rotor 4 to the armature 7 (the clutch on-state). Here, the permanent magnet 2 is held in the first position, so that the clutch on-state is maintained.

The holding of the position of the permanent magnet 2 can be achieved by simply stopping the rotation of the motor 27. This is due to the following reason. That is, the rotation of the rotatable member 23 is not transmitted to the worm 28 side. Therefore, when the rotation of the worm 28 is stopped, the position of the rotatable member 23 is maintained.

Next, the worm 28 is driven by the motor 27 to rotate the rotatable member 23 to place each permanent magnet 2 into the second position. In this state, the magnetic flux does not substantially flow between the rotor 4 and the armature 7 (or barely flows between the rotor 4 and the armature 7 at the weak level), so that the magnetic attractive force between the rotor 4 and the armature 7 is reduced or eliminated. Therefore, the armature 7 is urged away from the rotor 4 by the urging force of the resilient member 8 to form the gap 6 between the rotor 4 and the armature 7. Thus, the transmission of the rotational drive force from the engine to the refrigerant compressor C is disabled (in the clutch off-state). Here, the permanent magnet 2 is held in the second position, so that the clutch off-state is maintained.

Now, the advantages of the first embodiment will be described.

The drive force transmission apparatus 1 of the first embodiment has the magnet position changing arrangement 50 that changes the position of each permanent magnet 2 between the first position and the second position to change the circuit between the first magnetic circuit, in which the magnetic flux flows through the rotor 4 and the armature 7, and the second magnetic circuit, in which the magnetic flux possibly flowing through the rotor 4 and the armature 7 is smaller, i.e., weaker than that of the first magnetic circuit. In this way, the shifting between the clutch on-state and the clutch off-state is implemented.

In this way, when each permanent magnet 2 is placed into the first position, the armature 7 is attracted to the rotor 4 due to the magnetic flux generated by the first magnetic circuit to implement the clutch on-state. When the permanent magnet 2 is held in the first position, the clutch on-state is maintained.

Furthermore, when each permanent magnet 2 is placed into the second position, the armature 7 is displaced away from the rotor 4 to implement the clutch off-state. When the permanent magnet 2 is held in the second position, the clutch off-state is maintained.

Here, in the clutch off-state, at the time of applying, for example, the vibration or external force, the gap 6 between the rotor 4 and the armature 7 may possibly be reduced in some cases. However, in the second position of the permanent magnet 2, the magnetic flux does not substantially flow between the rotor 4 and the armature 7 (or barely flows between the rotor 4 and the armature 7 at the weak level), so that the magnetic attractive force between the rotor 4 and the armature 7 is reduced or eliminated. Therefore, even when the gap 6 between the rotor 4 and the armature 7 is reduced due to, for example, the vibration or external force, the armature 7 is not attracted to the rotor 4. Thus, it is possible to limit the unintentional erroneous coupling between the rotor 4 and the armature 7.

Furthermore, the shifting between the clutch on-state and the clutch off-state is executed by changing the positions of the permanent magnets 2. Furthermore, after the shifting from the clutch off-state to the clutch on-state, the coupled state of the rotor 4 and the armature 7 is maintained only by the magnetic flux, which is generated by the permanent magnets 2. Therefore, unlike the prior art, the electromagnetic coil, which generates the magnetic flux, is not required.

Furthermore, the drive force transmission apparatus 1 of the first embodiment rotates the permanent magnets 2, which are received in the stator 3, through use of the rotatable member 23, the rotating device (the rotating means) 24 for rotating the rotatable member 23, and the link mechanism 26 for rotating the permanent magnets 2 synchronously with the rotation of the rotatable member 23.

With the above construction, the permanent magnets 2 can be more effectively rotated in comparison to the case where the permanent magnets 2 are directly individually rotated.

Furthermore, in the drive force transmission apparatus 1 of the first embodiment, the rotatable member 23 is rotated by the worm gear that includes the worm 28, which is rotated by the motor 27, and the worm wheel 29, which is provided to the outer peripheral part of the rotatable member 23.

In this way, the rotation of the rotatable member 23 is not transmitted to the worm 28 side. Therefore, the rotation of the rotatable member 23 can be stopped at the predetermined position by simply stopping the rotation of the worm 28, and the position of each permanent magnet 2 can be maintained.

Second Embodiment

Figure 7:
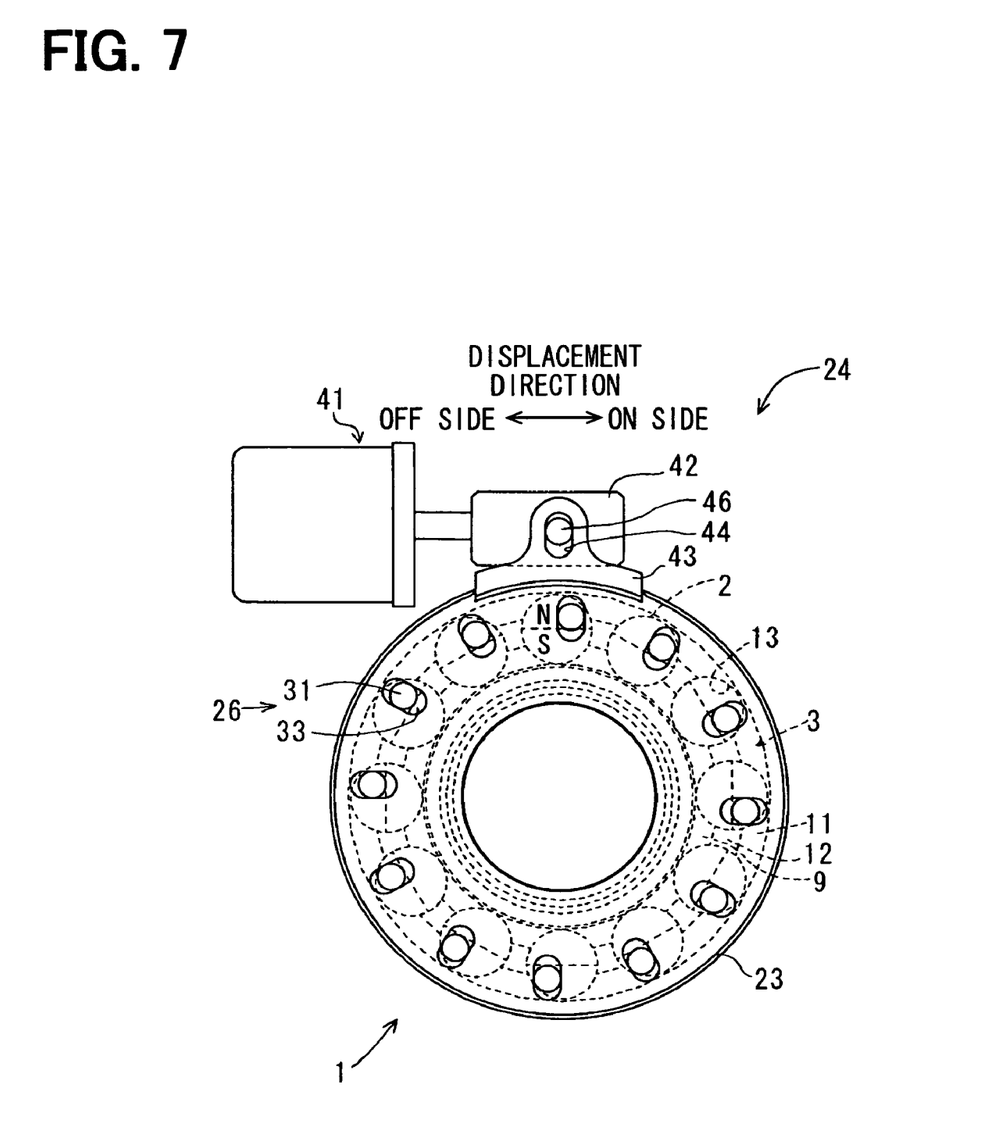
FIG. 7 is an axial view taken in an axial direction of a rotatable member of a drive force transmission apparatus according to a second embodiment of the present invention, showing the drive force transmission apparatus held in a clutch on-state.

A structure of a drive force transmission apparatus 1 according to a second embodiment of the present invention will be described with reference to FIG. 7 with respect to differences, which are different from the first embodiment.

In the drive force transmission apparatus 1 of the second embodiment, the rotating device 24 includes a linear solenoid 41 in place of the motor 27 of the first embodiment. The rotatable member 23 is rotated synchronously with displacement of a plunger 42.

Specifically, the linear solenoid 41 is placed such that the displacement direction (moving direction) of the plunger 42 generally coincides with a tangential direction that is tangential to an imaginary circle that is coaxial with the axis of the rotatable member 23. Furthermore, an engaging portion 43 is provided to the outer peripheral part of the rotatable member 23 to project radially outward. A pin 46 is provided to the plunger 42 and is received through an elongated hole 44 of the engaging portion 43, which extends through the engaging portion 43 in the axial direction. In this way, when the plunger 42 is displaced through energization of the linear solenoid 41, the rotatable member 23 is rotated by the crank action. Then, when the rotatable member 23 is rotated, the permanent magnets 2 are rotated by the mechanism, which is similar to the one discussed in the first embodiment.

Here, a spring (not shown) may be provided in the linear solenoid 41 to urge the plunger 42 toward one end side (the clutch on-state side) in the displacement direction.

In such a case, the shifting from the clutch on-state to the clutch off-state is executed by the energization of the linear solenoid 41 to displace the plunger 42 toward the other end side in the displacement direction against the urging force of the spring, so that each permanent magnet 2 is shifted from the first position to the second position.

Here, the second position of the permanent magnet 2 (at which the S-pole and the N-pole are short circuited through the inner stator portion 9 and the outer stator portion 11) can be maintained easily once the second position of the permanent magnet 2 is implemented. Furthermore, the shifting of the permanent magnet 2 from the second position to the first position requires the large torque. In the first position of the permanent magnet 2 (at which the direction of magnetization of the permanent magnet 2 generally coincides with the radial direction of the stator 3), the shifting of the permanent magnet 2 from the first position to the second position is easier than the shifting of the permanent magnet 2 from the second position to the first position.

Therefore, even when the energization of the linear solenoid 41 is stopped in the state where the permanent magnet 2 is placed in the second position, the permanent magnet 2 maintains the second position to maintain the clutch off-state.

Furthermore, at the time of shifting from the clutch off-state to the clutch on-state, when the plunger 42 is displaced toward the one end side upon the energization of the linear solenoid 41, the spring provides the assist force, so that the urging force of the plunger 42 for urging the rotatable member 23 is increased. In this way, the shifting of the permanent magnet 2 from the second position to the first position, which requires the large torque, is made.

Furthermore, in the case where the one end side of the plunger 42 in the displacement direction is the clutch off-state side, and the other end side of the plunger 42 in the displacement direction is the clutch on-state side, the effect, which is similar to the one discussed above, can be obtained by urging the plunger 42 with the spring toward the other end side in the displacement direction.

Now, modifications of the above embodiments will be described.

Figure 8:
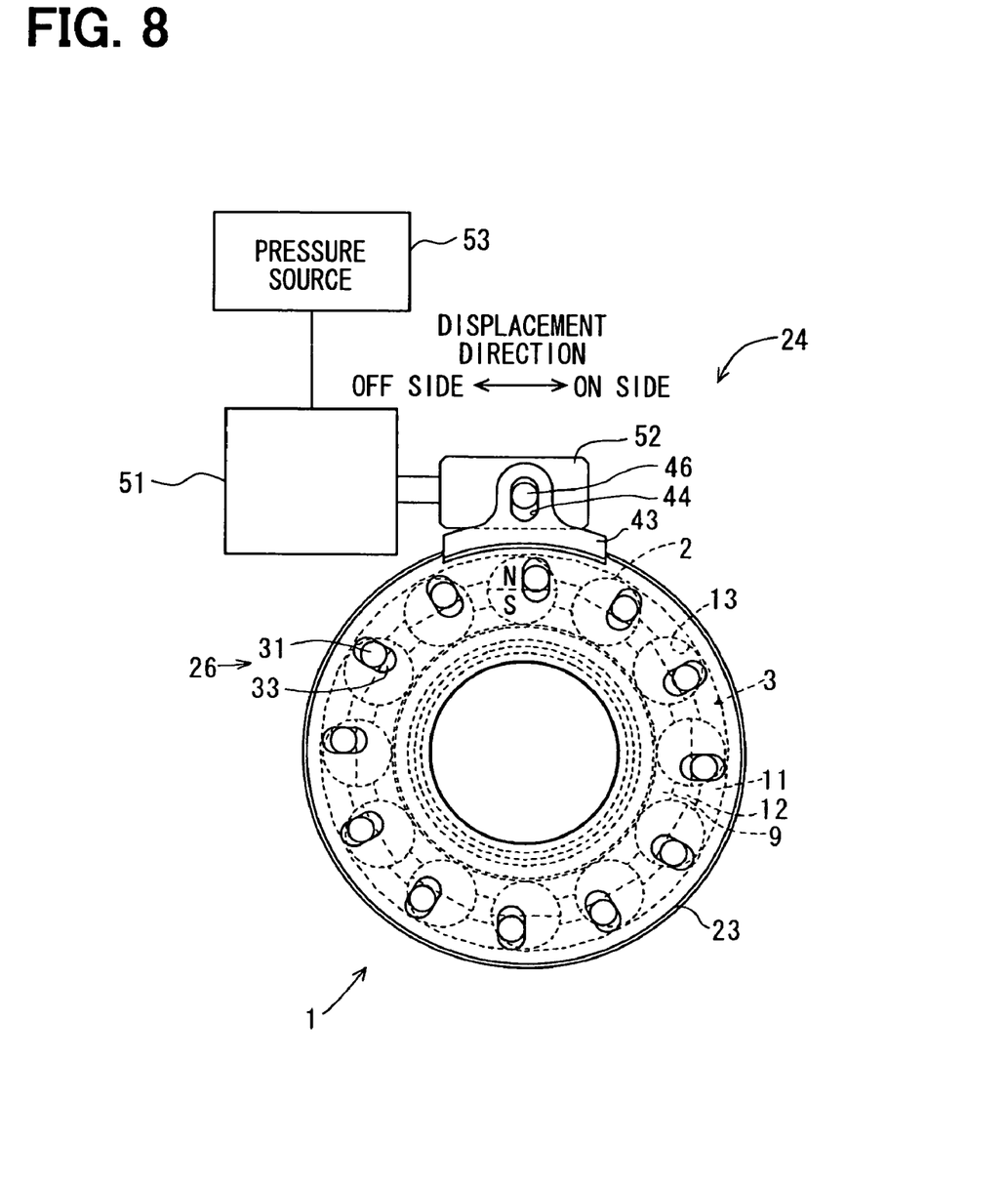
FIG. 8 is an axial view similar to FIG. 7, showing a modification of the drive force transmission apparatus of FIG. 7.

In the first embodiment, the motor 27 is used in the rotating device (the rotating means) 24. Furthermore, in the second embodiment, the linear solenoid 41 is used in the rotating device 24. Alternatively, the drive source of the rotating device 24 may be a hydraulic pressure source (e.g., hydraulic oil pressure source), a pneumatic pressure source or an internal pressure source of the refrigerant compressor C. For example, as shown in FIG. 8, the rotating device (the rotating means) 24 may include an actuator (e.g., a hydraulic actuator, a pneumatic actuator) 51, which is driven by a pressure supplied from a pressure source (e.g., a hydraulic oil pressure source, a pneumatic pressure source, a refrigerant pressure source) 53. The actuator 51 may be a conventional cylinder actuator having a piston (not shown), which is reciprocated in a closed cylinder (not shown) and is connected to a plunger 52 to reciprocate the plunger 52 and the engaging portion 43 connected thereto in the left-to-right direction in FIG. 8 to drive the rotatable member 23 in a manner similar to that of the second embodiment.

Particularly, in the case where the drive force transmission apparatus 1 is used for a rotating machine of the vehicle, the hydraulic pressure of the hydraulic oil pump (serving as the pressure source 53) or the pneumatic pressure of the pneumatic pump (serving as the pressure source 53) provided to the engine of the vehicle may be used as the drive source of the rotating device (the rotating means). In this way, it is possible to reduce the energy consumption.

Furthermore, in the case where the internal pressure source (serving as the pressure source 53) of the refrigerant compressor C is used to drive the rotating device 24, the refrigerant pressure is used as the drive source of the rotating device 24. Therefore, it is not required to provide a new drive source for the rotating device 24, so that it is possible to reduce the energy consumption.

Additional advantages and modifications will readily occur to those skilled in the art. The invention in its broader terms is therefore not limited to the specific details, representative apparatus, and illustrative examples shown and described.

What is claimed is:

1. A drive force transmission apparatus comprising:
a permanent magnet that is displaceable between a first position and a second position;
a magnet position changing means for rotating the permanent magnet between the first position and the second position about a rotational axis of the permanent magnet;
a rotor that is rotated upon receiving a rotational drive force from an external drive power source, wherein the rotor exerts a first magnetic attractive force in cooperation with the permanent magnet upon placing of the permanent magnet into the first position, and the rotor exerts no magnetic attractive force or a second magnetic attractive force, which is smaller than the first magnetic attractive force, in cooperation with the permanent magnet upon placing of the permanent magnet into the second position;
an armature that is connected to an external driven-side apparatus and is coupleable with the rotor to transmit the rotational drive force from the rotor to the external driven-side apparatus, wherein the armature is spaced from the rotor by a predetermined gap in an uncoupled state of the armature, in which the armature is uncoupled from the rotor; and
a resilient member that holds the armature such that the predetermined gap is maintained between the rotor and the armature in the uncoupled state of the armature, wherein:
the armature is magnetically attracted to and is coupled with the rotor against an urging force of the resilient member by the first magnetic attractive force of the rotor when the permanent magnet is placed into the first position; and
the armature is urged away from and is decoupled from the rotor by the urging force of the resilient member when the permanent magnet is placed into the second position.

2. The drive force transmission apparatus according to claim 1, wherein:
when the permanent magnet is placed in the first position, a first magnetic circuit is formed such that a magnetic flux, which is generated from the permanent magnet, is transmitted through the rotor and the armature; and
when the permanent magnet is placed in the second position, a second magnetic circuit that is formed such that a magnetic flux, which is generated from the permanent magnet and is transmittable to the rotor and the armature, is weaker than the magnetic flux of the first magnetic circuit.

3. The drive force transmission apparatus according to claim 1, further comprising a stator that is received in the rotor, wherein:
the permanent magnet is one of a plurality of permanent magnets provided in the drive force transmission apparatus;
the plurality of permanent magnets is received in the stator in such a manner that each of the plurality of permanent magnets is rotatable about the rotational axis of the permanent magnet; and
the magnetic position changing means rotates each of the plurality of permanent magnets about the rotational axis of the permanent magnet to displace the permanent magnet between the first position and the second position.

4. The drive force transmission apparatus according to claim 3, wherein the magnet position changing means includes:
a rotatable member that is rotatable about a center axis of the stator;
a rotating means for rotating the rotatable member; and
a link mechanism that is driven synchronously with rotation of the rotatable member to rotate each of the plurality of permanent magnets about the rotational axis of the permanent magnet.

5. The drive force transmission apparatus according to claim 4, wherein the rotating means includes:
an electric motor;
a worm that is rotated by the electric motor; and
a worm wheel that is provided to an outer peripheral part of the rotatable member to rotate integrally with the rotatable member, wherein the worm wheel is meshed with the worm to form a worm gear.

6. The drive force transmission apparatus according to claim 4, wherein:
the rotatable member is configured into a circular disc body and is opposed to the stator and the plurality of permanent magnets;
the link mechanism includes a plurality of pins and a plurality of elongated holes;
each of the plurality of pins is provided to one of the rotatable member and a corresponding one of the plurality of permanent magnets; and
each of the plurality of elongated holes is provided to the other one of the rotatable member and the corresponding one of the plurality of permanent magnets; and
each of the plurality of pins is received through a corresponding one of the plurality of elongated holes to form a crank mechanism between the rotatable member and the corresponding one of the plurality of permanent magnets.

7. The drive force transmission apparatus according to claim 6, wherein:
each of the plurality of pins is provided to the corresponding one of the plurality of permanent magnets at a location that is eccentric to the rotational axis of the permanent magnet; and
each of the plurality of elongated holes is provided to the rotatable member and receives the corresponding one of the plurality of pins therethrough.

8. The drive force transmission apparatus according to claim 4, wherein the rotating means includes a linear solenoid, which drives the rotatable member to rotate the rotatable member synchronously with displacement of the linear solenoid.

9. The drive force transmission apparatus according to claim 4, wherein the rotating means is driven by a hydraulic oil pressure supplied from an external hydraulic oil pressure source.

10. The drive force transmission apparatus according to claim 4, wherein the rotating means is driven by a pneumatic pressure supplied from an external pneumatic pressure source.

11. The drive force transmission apparatus according to claim 4, wherein the external driven-side apparatus is a refrigerant compressor of a vehicle air conditioning system, the rotating means is driven by a refrigerant pressure supplied from a refrigerant pressure source of the refrigerant compressor of the vehicle air conditioning system.

12. The drive force transmission apparatus according to claim 3, wherein:
when each of the plurality of permanent magnets is placed into the first position, an N-pole and an S-pole of the permanent magnet are opposed to each other generally in a radial direction of the stator; and when each of the plurality of permanent magnets is placed into the second position, the N-pole and the S-pole of the permanent magnet are opposed to each other generally in a circumferential direction of the stator.

13. The drive force transmission apparatus according to claim 12, wherein:
   each of the plurality of permanent magnets is configured into a cylindrical body and is rotatably received in a corresponding one of a plurality of receiving holes, which are arranged one after another at generally equal intervals in the stator in the circumferential direction of the stator;
   the stator includes:
      an annular outer stator portion, which is made of a magnetic material;
      an annular middle stator portion, which is placed radially inward of the annular outer stator portion and is made of a non-magnetic material; and
      an annular inner stator portion, which is placed radially inward of the annular middle stator portion and is made of a magnetic material;
   a radially outer end of each of the plurality of receiving holes is located in the annular outer stator portion;
   a radially inner end of each of the plurality of receiving holes is located in the annular inner stator portion;
   a radially middle part of each of the plurality of receiving holes, which is placed radially between the radially outer end and the radially inner end of the receiving hole, is located in the annular middle stator portion;
   when each of the plurality of permanent magnets is placed into the first position, one of the N-pole and the S-pole of the permanent magnet contacts the annular inner stator portion, and the other one of the N-pole and the S-pole of the permanent magnet contacts the annular outer stator portion; and
   when each of the plurality of permanent magnets is placed into the second position, each of the N-pole and the S-pole of the permanent magnet contacts both of the annular inner stator portion and the annular outer stator portion.

14. A drive force transmission apparatus comprising:
   a permanent magnet that is displaceable between a first position and a second position;
   a magnet position changing means for rotating the permanent magnet between the first position and the second position about a rotational axis of the permanent magnet;
   a rotor that is rotated about an axis spaced from and parallel to the rotational axis of the permanent magnet upon receiving a rotational drive force from an external drive power source, wherein the rotor exerts a first magnetic attractive force in cooperation with the permanent magnet upon placing of the permanent magnet into the first position, and the rotor exerts no magnetic attractive force or a second magnetic attractive force, which is smaller than the first magnetic attractive force, in cooperation with the permanent magnet upon placing of the permanent magnet into the second position;
   an armature that is connected to an external driven-side apparatus and switches between a coupled state and an uncoupled state with the rotor, and when in a coupled state transmitting the rotational drive force from the rotor to the external driven-side apparatus by rotating about a hub, wherein the armature is axially spaced from the rotor by a predetermined gap in the uncoupled state of the armature, in which the armature is uncoupled from the rotor; and
   a resilient member that holds the armature such that the predetermined gap is maintained between the rotor and the armature in the uncoupled state of the armature, wherein:
   the armature is magnetically attracted to and is coupled with the rotor against an urging force of the resilient member by the first magnetic attractive force of the rotor when the permanent magnet is placed into the first position; and
   the armature is urged away from and is decoupled from the rotor by the urging force of the resilient member when the permanent magnet is placed into the second position.

15. The drive force transmission apparatus according to claim 14, wherein:
   when the permanent magnet is placed in the first position, a first magnetic circuit is formed such that a magnetic flux, which is generated from the permanent magnet, is transmitted through the rotor and the armature; and
   when the permanent magnet is placed in the second position, a second magnetic circuit that is formed such that a magnetic flux, which is generated from the permanent magnet and is transmittable to the rotor and the armature, is weaker than the magnetic flux of the first magnetic circuit.

16. The drive force transmission apparatus according to claim 14, further comprising a stator that is received in the rotor, wherein:
   the permanent magnet is one of a plurality of permanent magnets provided in the drive force transmission apparatus;
   the plurality of permanent magnets is received in the stator in such a manner that each of the plurality of permanent magnets is rotatable about the rotational axis of the permanent magnet; and
   the magnetic position changing means rotates each of the plurality of permanent magnets about the rotational axis of the permanent magnet to displace the permanent magnet between the first position and the second position.

17. The drive force transmission apparatus according to claim 16, wherein the magnet position changing means includes:
   a rotatable member that is rotatable about a center axis of the stator;
   a rotating means for rotating the rotatable member; and
   a link mechanism that is driven synchronously with rotation of the rotatable member to rotate each of the plurality of permanent magnets about the rotational axis of the permanent magnet.

18. The drive force transmission apparatus according to claim 17, wherein the rotating means includes:
   an electric motor;
   a worm that is rotated by the electric motor; and
   a worm wheel that is provided to an outer peripheral part of the rotatable member to rotate integrally with the rotatable member, wherein the worm wheel is meshed with the worm to form a worm gear.

19. The drive force transmission apparatus according to claim 17, wherein:
   the rotatable member is configured into a circular disc body and is opposed to the stator and the plurality of permanent magnets;
   the link mechanism includes a plurality of pins and a plurality of elongated holes;
   each of the plurality of pins is provided to one of the rotatable member and a corresponding one of the plurality of permanent magnets; and each of the plurality of elongated holes is provided to the other one of the rotatable member and the corresponding one of the plurality of permanent magnets; and each of the plurality of pins is received through a corresponding one of the plurality of elongated holes to form a crank mechanism between the rotatable member and the corresponding one of the plurality of permanent magnets.

20. The drive force transmission apparatus according to claim 17, wherein the rotating means includes a linear solenoid, which drives the rotatable member to rotate the rotatable member synchronously with displacement of the linear solenoid.

* * * * *